No. 810,115. PATENTED JAN. 16, 1906.
W. R. GREEN.
ABSORBENT BANDAGE AND MATERIAL THEREFOR.
APPLICATION FILED FEB. 29, 1904.
Fig. 1.
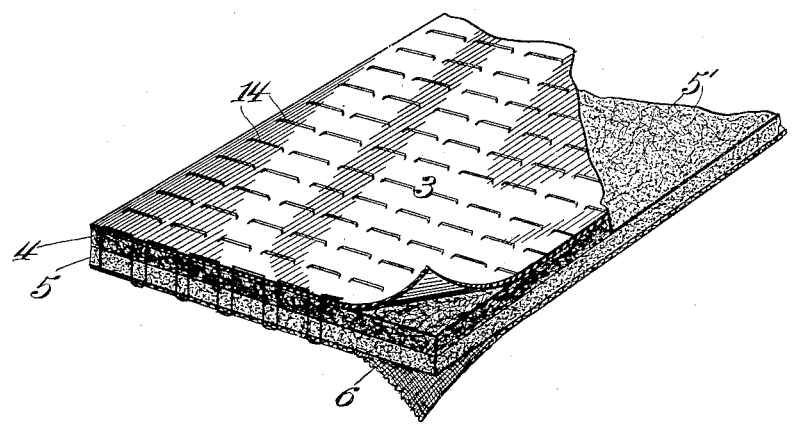
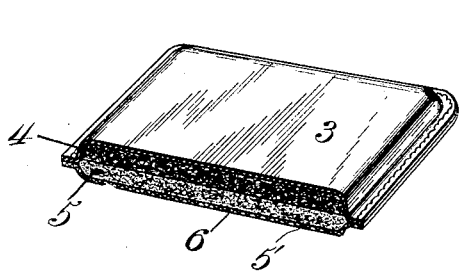
Fig. 2.
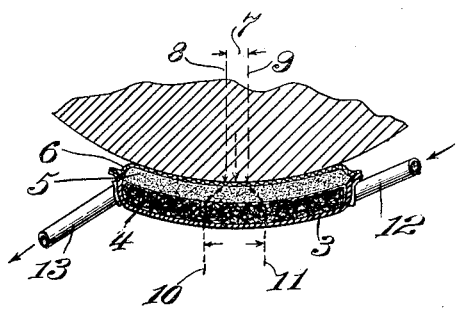
Fig. 3.
Witnesses:
F. E. Maynard
Robert Ott
Inventor:
Willard R. Green;
By his Attorney,
F. H. Richards.

UNITED STATES PATENT OFFICE.

WILLARD R. GREEN, OF MUSCATINE, IOWA.

ABSORBENT BANDAGE AND MATERIAL THEREFOR.

No. 810,115.  Specification of Letters Patent.  Patented Jan. 16, 1906.

Application filed February 29, 1904. Serial No. 195,729.

*To all whom it may concern:*

Be it known that I, WILLARD R. GREEN, a citizen of the United States, residing in Muscatine, in the county of Muscatine and State of Iowa, have invented certain new and useful Improvements in Absorbent Bandages and Materials Therefor, of which the following is a specification.

This invention relates to absorbent materials, the object being to furnish an improved material adapted to be made up in sheet form ready for use in the manufacturing of pads, bandages, and other articles adapted for absorbing and retaining fluids, more especially as required for medical and hygienic purposes.

In the accompanying drawings, Figure 1 represents a portion of a sheet of absorbent material made in accordance with my present invention. In this view some of the parts are broken away for the better illustration of some features of the material. Fig. 2 shows a portion of an absorption pad or bandage for the making of which my improved absorbent material when made in sheet form—as illustrated, for instance, in Fig. 1—is especially adapted. Fig. 3 is a diagrammatic view illustrative of some features of the operation of the absorbent material when applied in the form of a pad or bandage to a surface to be treated.

Similar characters designate like parts in all the figures.

For the covering 3 of my absorbent material I preferably employ some suitable waterproof layer or dam—as, for instance, sheet-rubber or a fabric treated with rubber or treated with other fluid-resisting material, as the case may require—so that such covering may constitute a dam or cut-off for stopping any undue passage of the fluids through the article. Next to the dam or resistant backing 3 I prefer to employ as a receiving and retaining member a relatively thick mass or layer 4 of absorbent fiber. This fiber member may be of fiber of any suitable character or material—as, for instance, absorbent-cotton fiber, linen fiber, or the like. The fiber in said member 4 may be disposed in a mass or layer either in a matted form, as in a bat, or, as I prefer, it may be built up in an organized form and condition—such, for instance, as a loosely-woven fabric arranged in layers. A receiving and retaining member built up of woven fabric as here indicated I find to be particularly effective and desirable for some uses, especially when relatively large quantities of fluid are to be retained for a considerable time. Next to this absorbent layer I apply a layer 5, consisting of a granular material. Among such materials sand may be mentioned as suitable for use in some cases, although other granular minerals or analogous substances may be employed. Granular materials of vegetable or other origin may also be used. A further improvement of the layer 5 relates to the entanglement or intermeshing of the granular material with fibers 5' of such a nature or character as to assist in retaining the granular substance and so guard against the too free flowage or dislodgment thereof while the bandage or other protective or absorbent article made of my improved material shall be in use. It is a well-known tendency of fiber, particularly cotton, linen, or similar fiber, to more or less mat or felt when wetted, thereby reducing its conductivity for fluids. In intermingling fibers with the granular material, as just described, I therefore deem it desirable to use only a relatively small amount of fibers and only enough to "carry" the granules. The fibers being thus largely separated from one another their normal tendency to mat is thereby counteracted and the conductivity of layer 5 insured against undue deterioration.

One feature of my present improvement relates to the coating of the granules of the receiving and distributing member or layer 5 with antiseptic or absorbent materials. For this purpose the ordinary borax antiseptic solutions may be used for depositing a coating upon and over the granules, or other well-known salts or solutions of antiseptic or absorbent character may in some cases be employed. Another feature of improvement relates to the combination, with the granular material, which in the drawings is shown formed in a layer as in connection with a fibrous mass or reservoir 5, of a coating applied to the granules and consisting of a salt or compound adapted to act as a solvent of the thicker or coagulative portions of the blood or of pus with a view of rendering the material better adapted for use as an application in some cases to wounds or sores, as by this means the coatings of the granules may consist of substances which are not only antiseptic in character, but which have a tendency to dissolve such materials as tend to thicken, and thus tend to impair the efficiency and value of a pad or bandage or other analogous article made from my improved absorbent material. Having thus increased the activity of the granules for absorption of fluid or semifluid substances by coating them with a chemical substance—as, for instance, a suitable salt—it is obvious important advantages may be attained. Among the materials which may be used for such coatings may be mentioned compounds of borax and soda and other chemical materials adapted for increasing the fluidity of coagulative substances or for increasing the capillary activity of the granular mass or layer. It will be evident that for some uses the granules may preferably be graded or selected of a size larger than would be most desirable for other uses, depending somewhat on the degree of fluidity of the fluid or material to be absorbed. The antiseptic, hygroscopic, or other medication substance may in some cases be employed in the form of a powder or in grains mingled with the granules that constitute the body of the granular member of the material or pad. It will be understood that the term "pus solvent" is intended to refer to such medication substances as have that effect, including those which act to dissolve or modify chemically or by medication blood or the exudation of sores and wounds.

For use in making the granular layer of the material I deem it preferable to use granules formed of some mineral having a higher heat-conducting power than the fiber, since by this means the granules operate, as I apprehend, as a means for producing a "cooling" effect on the wound or other surface being treated, this result doubtless being due to the rapidity with which such a mineral substance is able to conduct the heat away from the thin and relatively open layer 6, as well as by the separation of the relatively thick fibrous member 4 from the wound or surface by means of a layer of the general character herein described.

As a face member for application directly to the surface to be protected—as, for instance, in the case of a wound—the granular material is shown provided with a retaining layer of facing 6 of relatively open texture, through which the fluids—as, for instance, water, serum, or blood—may pass with comparative freedom, and so may be conducted into the granular distribution member or mass 5, there to be subjected to antiseptic or other treatment, due to the particular kind of coating material on the particles or granules of said layer 5. Of course the texture of the layer 6 should be fine enough to properly retain the particles of the granular layer 5.

As a convenient means for holding the layers together when the absorption material is made up in sheet form ready for use in the making of bandages or analogous articles I prefer to employ stitching, as roughly indicated at 14. The stitches may be arranged after the manner of "quilting," the stitches being suitably spaced for properly holding together the several layers of the material and being at the same time of such a loose and separated character as to permit of the sufficiently free bending of the material as a whole and of a pad or bandage made therefrom for the purpose of applying the same to a wound as may be required in any suitable case.

In some cases the layer 3 may be removed or omitted, and the sheet material may then be formed into plugs or other shapes, (with or without the said covering 3,) and so may be employed in the cavities of open wounds or the like. Also it will be understood that the layer of absorbent fiber 4 may be treated with antiseptic or analogous preparations, with or without similar preparation of the granular member.

The fluids or emanations from a wound may be effectually treated by means of the antiseptic or chemical compositions employed in the granular or other layer of the article or material, which may of course be made up in large sheets, so as to be adapted for cutting and shaping to any size or form desired. The sand granules absorb the fluid between them and convey the same through its entire mass, keeping the wound at once relatively dry and cool. The granular substance likewise, as I apprehend, possesses a greater power for conveying than it has for holding the fluid, and this feature is especially valuable in view of the fact that the primary object is to draw and carry away the fluid from the wound. In other words, it will not accumulate the fluid in one part to the detriment of another. It distributes it evenly throughout the mass and exposes it to a large surface of the fibrous portion. It also possesses a mechanical advantage in the granular layer of having a higher degree of mobility to adjust itself to the slight undulations of a wound than the fibrous layer 4 would have. In a sense this granular layer is a species of absorber and filter combined. One of its chief functions is that of a quick-acting absorbent layer on the side directly against the wound. The fluid is taken up and passed along to the fibrous layer, at the same time being spread more widely.

In practice when a sheet of this material is cut the piece cut out for use may be fastened around the edges by drawing together and stitching the outer layers, or it may be confined in any other convenient manner.

One of the features of my improved material which particularly relates to the granular portion thereof consists in the quality which such a granular portion or layer has of acting as a species of conveyer and filter through which the fluids to be absorbed may pass into the absorption layer or reservoir 4, there to be retained or otherwise disposed of.

Also, as already noted, said granular layer acts as a disseminator, furnishing a means in and through which the absorbed fluids may be spread or distributed over a larger area. This feature I have illustrated by diagrammatic lines in Fig. 3, on which the space 7, between lines 8 and 9, indicates, for instance, the area on which the exudation from a wound—as, for instance, a gunshot wound—may pass through the layer 6 into the granular layer, the stream of fluid spreading in the granular layer, as indicated by dotted lines 10 and 11, to a much larger area against the surface of the absorptive mass or reservoir 4. In Fig. 3 I have also illustrated, by way of showing one of the advantages of my present improvements, how an absorption pad or bandage made from my improved absorbent material may be cleansed, and thereby its efficiency renewed without removal of the bandage. At 12 is represented a small tube, preferably of rubber or other flexible construction, attached to the closed edge of the bandage and located for delivering water or other cleansing or irrigating fluid into the fibrous reservoir or member 4. At the opposite side corresponding to 12 a small tube 13 is shown leading from said fibrous reservoir. By attaching a suction device—as, for instance, a small hand-pump of ordinary construction—at the outlet-tube 13 the fluid from said reservoir 4 may be forcibly withdrawn, in the meantime the operator allowing the cleansing fluid to flow into the reservoir through the tube 12—as, for instance, from a funnel or other receptacle applied to said tube. By this or similar means the absorption-reservoir may be treated with medical or analogous preparations, the substances held in the reservoir may be flushed or washed out, and solvents may be used as required for dissolving any such substances as may not otherwise be readily removed. Also by such means as here referred to the wound itself may be treated, also the surfaces around the same, by fluids circulated through the interior of the bandage and reaching the surfaces to be treated through the granular layer. By this method and by means of my present improvements in absorbent materials a wound or sore may be washed or treated medically without removing the bandage from the wound, and consequently with little, if any, danger of injuring the surface by abrasion or tearing of the surface being treated or permitting the parts to become displaced.

The granules will in some cases be treated to form a coating thereon having hygroscopic qualities, and this same treatment may also be applied to the fibrous members of the material.

I claim—

1. An absorbent material for surgical purposes comprising a plurality of layers, one of which consists of sand or analogous granular material, and means for flushing the same.

2. An absorbent material for surgical purposes, comprising a mass or body of absorbent, a part thereof made up of a granular material treated with a pus solvent.

3. An absorbent material for surgical purposes made up of a body or mass of absorbent comprising fibrous material and a granular material.

4. An absorbent material for surgical purposes made up of a body or mass of absorbent comprising fibrous material and a granular material, the granular material being treated with a pus solvent and the fibrous material with an antiseptic.

5. An absorbent material for surgical purposes comprising a layer of fibrous material, and a layer of granular material intermingled with loose fibers.

6. An absorbent pad comprising a waterproof layer, a granular layer, a fibrous layer between the waterproof layer and the granular layer, an open texture facing for the granular layer, said waterproof layer and facing being drawn together and connected to inclose the granular layer and the fibrous layer.

7. In an absorption-pad, a waterproof layer, a granular layer, a fibrous layer between the waterproof layer and the granular layer, an open texture facing for the granular layer, said waterproof layer and facing being drawn together and fastened to inclose the granular layer and the fibrous layer and flushing means comprising an inlet at one side, and an outlet located at a distance from said inlet.

8. In an absorption-pad of the class specified a receiving and distributing granular member, a receiving and retaining fibrous member, means for connecting and retaining said granular and fibrous members, and means for flushing the interior of the pad while this is in use.

Signed at Nos. 9 to 15 Murray street, New York, N. Y., this 24th day of February, 1904.

WILLARD R. GREEN.

Witnesses:
F. H. RICHARDS,
FRED. J. DOLE.